United States Patent [19]

Kalberer et al.

[11] Patent Number: 5,547,149
[45] Date of Patent: Aug. 20, 1996

[54] AIRCRAFT AIRBAG PROTECTION APPARATUS AND METHOD

[75] Inventors: Robert C. Kalberer, Boulder; Dan Goor, Colorado Springs, both of Colo.

[73] Assignee: Flight Safety Systems Inc., Boulder, Colo.

[21] Appl. No.: 242,936

[22] Filed: May 16, 1994

[51] Int. Cl.$^6$ .................................................. B64D 25/00
[52] U.S. Cl. ........................ 244/121; 244/220; 244/234; 280/730.1; 280/731
[58] Field of Search ................... 244/121, 118.5; 280/728.1, 728 R, 728 L, 728 A, 729, 730.1, 730 R, 730.2, 731

[56] References Cited

U.S. PATENT DOCUMENTS

| | | |
|---|---|---|
| 3,218,103 | 11/1965 | Boyce . |
| 3,630,472 | 12/1971 | Axenborg ........................ 280/730.2 |
| 3,836,168 | 9/1974 | Nonaka et al. . |
| 4,290,627 | 9/1981 | Cumming et al. ................ 280/732 |
| 4,508,294 | 4/1985 | Lorch . |
| 4,832,287 | 5/1989 | Werjefelt . |
| 4,968,965 | 11/1990 | Naitou et al. . |
| 4,999,775 | 3/1991 | Muraoka . |
| 5,073,860 | 12/1991 | Blackburn et al. . |
| 5,107,245 | 4/1992 | Gesper et al. . |
| 5,125,472 | 6/1992 | Hara ................................... 280/731 |
| 5,190,313 | 3/1993 | Hickling ............................ 244/121 |
| 5,225,985 | 7/1993 | Okano . |
| 5,261,694 | 11/1993 | White et al. . |

FOREIGN PATENT DOCUMENTS

| | | | |
|---|---|---|---|
| 4105821 | 8/1992 | Germany . | |
| 9317894 | 9/1993 | WIPO ................................ 244/121 |

Primary Examiner—Andres Kashnikow
Assistant Examiner—Tien Dinh
Attorney, Agent, or Firm—F. A. Sirr; E. C. Hancock; Holland & Hart LLP

[57] ABSTRACT

Airbags are positioned in a general aviation aircraft cockpit relative to a control yoke, a pilot, and a front seat passenger. Airbag actuation is controlled by a adaptive programmable controller such as a microcomputer. Airbag actuation is based upon information that the controller receives from multiple acceleration sensors. The outputs of the acceleration sensors are subjected to thresholding techniques, such as output signal weighting and/or majority voting. A programmable threshold is adaptively established for the controller based upon unique aircraft parameters, such as weight, altitude, angle of attack, ground and/or air speed, etc. The controller ignores all acceleration sensor inputs that do not meet this adaptive threshold. Thus, airbag actuation takes place only when a sufficient acceleration event occurs concurrently with the presence or absence of defined aircraft parameters that establish a proper threshold for the acceleration event. Airbag inflation includes a controllable delay that is used to customize airbag inflation to particular aircraft parameters, such as ground/air speed and weight.

51 Claims, 6 Drawing Sheets

$90 = 81 \circ \overline{88} \circ 86 \circ \overline{87}$

AIRCRAFT AIRBAG PROTECTION APPARATUS AND METHOD

CROSS-REFERENCE TO RELATED APPLICATIONS

U.S. patent application Ser. No 07/973,798, filed Nov. 9, 1992, and entitled "Aircraft Airbag Protection Apparatus and Method", now U.S. Pat. No. 5,301,902 incorporated herein by reference.

U.S. patent application Ser. No. 08/054,925, filed Apr. 28, 1993, and entitled "Adaptive Aircraft Airbag Protection Apparatus and Method", now U.S. Pat. No. 5,335,884, incorporated herein by reference.

U.S. patent application Ser. No. 08/242,796, filed of even date herewith, and entitled "Aircraft Control Yoke", incorporated herein by reference.

BACKGROUND OF THE INVENTION

1. Field of the Invention

The present invention relates to devices and processes for improving the ability of an aircraft pilot to maintain control in the event that the aircraft experiences an excessive acceleration force. More particularly, the present invention relates to safety oriented apparatus and methods deploying aircraft airbags. The invention is useful for small aircraft, and is well suited as a modification to existing aircraft.

2. Description of the Related Art

The application of airbags as a safety feature to protect a vehicle occupant from injury (or at least to minimize the prospect of injury to the vehicle occupant) has received considerable attention in conjunction with the automobile industry. An example is U.S. Pat. No. 3,836,168 by Nonaka et al, which shows airbags functionally operable in conjunction with a shoulder harness.

U.S. Pat. No. 5,073,860 by B. K. Blackburn et al recognizes that "it is not desirable to inflate a vehicle airbag under all types of crashes to which the vehicle is subjected", such as "a low speed, non-deployment crash". The determination of what constitutes a non-deployment crash "is dependent on various factors relating to vehicle type", and includes "a large vehicle traveling eight miles per hour hits a parked vehicle", in which case, seat belts are sufficient. This patent provides a time domain vibratory electrical signal having frequency components indicative of a vehicle crash condition. This time, domain signal is converted to a frequency domain signal. The frequency domain signal is correlated, and the airbags are actuated only when the correlation indicates a particular type of crash is occurring. The airbags are not actuated when the correlation indicates that a non-deployment crash is occurring.

U.S. Pat. No. 4,968,965 by M. Naitou et al is directed to apparatus for recording the operation of a vehicle airbag device. An accelerometer provides an output signal, depending upon vehicle acceleration, and this signal triggers air actuation. A decision circuit determines whether or not the airbag should be activated in response to the accelerometer signal.

A number of patents teach the use of a microprocessor in an airbag control arrangement. These patents include U.S. Pat. No. 4,999,775 by K. Muraoka which is directed to preventing the consumption of battery power by airbag diagnostic apparatus from the time the vehicle is shipped until the vehicle is first started; U.S. Pat. No. 5,107,245 by C. Gesper et al which is directed to an automobile restraint system (seatbelt or airbag) that includes a microcomputer to process the output of an acceleration pickup, and wherein the output of the acceleration pickup is inhibited if a fault is detected; U.S. Pat. No. 5,225,985 by M. Okano which uses an acceleration/deceleration sensor to actuate an airbag; and U.S. Pat. No. 5,261,694 by G. W. White et al which relates to a processor-controlled airbag system wherein when a malfunction is detected, the system is reconfigured to substitute one FET for another.

Others have addressed the application of airbags to aircraft, such as in U.S. Pat. No. 4,508,294 by Lorch and 3,218,103 by Boyce. The Lorch patent includes a bidirectionally expanding set of airbags from a hoop around the waist of the aircraft occupant to encapsulate that occupant upon actuation. The Boyce patent likewise teaches use of a relatively complete encapsulation of the occupant of a seat, although it is shown operational in conjunction with a shoulder harness.

German document DE 41 05 821A1 describes an automotive airbag system wherein the rake of a tilting steering wheel is adjusted downward, if it has been set more upright than normal, prior to airbag release.

While the prior art is generally useful for the stated intended purposes, the prior art has failed to provide an aircraft airbag actuation apparatus and method that provides an intelligent aircraft airbag actuation system in which an airbag(s) is selectively actuated by a programmable-type controller that determines whether conditions are appropriate for the activating airbag(s) in the cockpit of an aircraft, and wherein the time of airbag inflation, and/or profile of airbag inflation, is adaptively controlled.

SUMMARY OF THE INVENTION

The present invention provides an intelligent aircraft airbag actuation apparatus and method in which an aircraft airbag assembly is selectively actuated by an adaptive programmable controller that operates to determine if aircraft operation conditions, such as weight, altitude, speed, and angle of attack are appropriate for activating an airbag assembly that is located in the cockpit of the aircraft.

An object of the invention is to prevent airbag inflation when airbag inflation would be of no benefit, and likely would be a safety hazard. This invention is effective to enable the deployment of an aircraft airbag under conditions in which airbag inflation increases survivability, and operates to disable airbag deflation under conditions in which airbag inflation would become a hindrance to safety.

The present invention is effective to enable a pilot to attempt to retain aircraft control when an initial force on the aircraft occurs during an aircraft operation condition that may render further aircraft control a likely possibility.

A feature of this invention is that it provides majority voting acceleration sensors in a configuration for enhancing reliability of the airbag actuation system.

Acceleration sensors are arranged to detect that the aircraft has experienced an abnormal, catastrophic, excessive, or injury threatening force; for example, an excessive acceleration event. An airbag is mounted relative to a control yoke for responding to an actuation signal from the sensors. The airbag expands so as to substantially fill the surrounding space in at least two directions; namely, the space between the control yoke and the pilot, and the space between the control yoke and the frame of the aircraft.

An airbag actuation signal is produced when the acceleration sensors detect an excessive acceleration force, and the airbag then expands into a somewhat cocoon-like envelope. These acceleration sensors preferably include a plurality of sensors, at least one of which is aligned with the normal direction of movement of the aircraft. Further, these acceleration sensors can include at least one string or array of sensors, which are all positioned in common alignment. Reliability is enhanced by determining that a majority of these commonly-aligned acceleration sensors are detecting the presence of an excessive, or catastrophic level of acceleration, before producing an airbag actuation signal.

The details of construction and arrangement of these acceleration sensors is not critical to the invention, nor is the means of providing a signal thresholding function, such as majority voting. For example, majority voting may be provided based upon sensor output magnitude, based upon the combined output of the sensors, and/or based upon sensor outputs that exceed a threshold. In effect, the invention provides an acceleration sensor output threshold that is adaptively established as a function of aircraft operating parameters.

The process of the invention starts with detection that an excessive acceleration force was applied to the aircraft in the general direction of movement thereof. The normal response to this detection is the filling of the space between the pilot and the aircraft's front panel with a force absorber, typically an airbag.

Reliability of the acceleration detecting step is improved if the detecting of excessive acceleration force occurs at a plurality of locations, and if it is determined that a majority of the acceleration sensors, or detectors at those locations, has concurrently detected that an excessive acceleration event has occurred.

An object of the invention is to minimize the prospect for loss of control of an airborne aircraft, the aircraft, including a control member for manual movement by a pilot to facilitate control of the aircraft, first means for sensing that the aircraft has experienced an excessive acceleration and for generating a control signal in response to this excessive acceleration force, an airbag mounted relative to the control member and the pilot, the airbag being responsive to the control signal, second means for sensing the presence or absence of unique aircraft operating parameters, and means responsive to this second means and operable to prevent response of the airbag to the control signal as a function of the these unique aircraft operating parameters wherein, for example, the aircraft operating parameters are selected from the group aircraft weight, aircraft altitude, aircraft ground and/or air speed, and/or aircraft angle of attack.

As a feature of the invention, an aircraft airbag system is provided that includes an aircraft airbag module, aircraft acceleration sensor means having an output connected to the airbag module and operable to selectively activate the airbag module, and means responsive to aircraft initialization or arming parameters, such as headphones in use, seat belts in use, and aircraft use authorization verified, connected to the airbag module and operable to inhibit operation of the airbag module as a function of the aircraft arming parameters.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
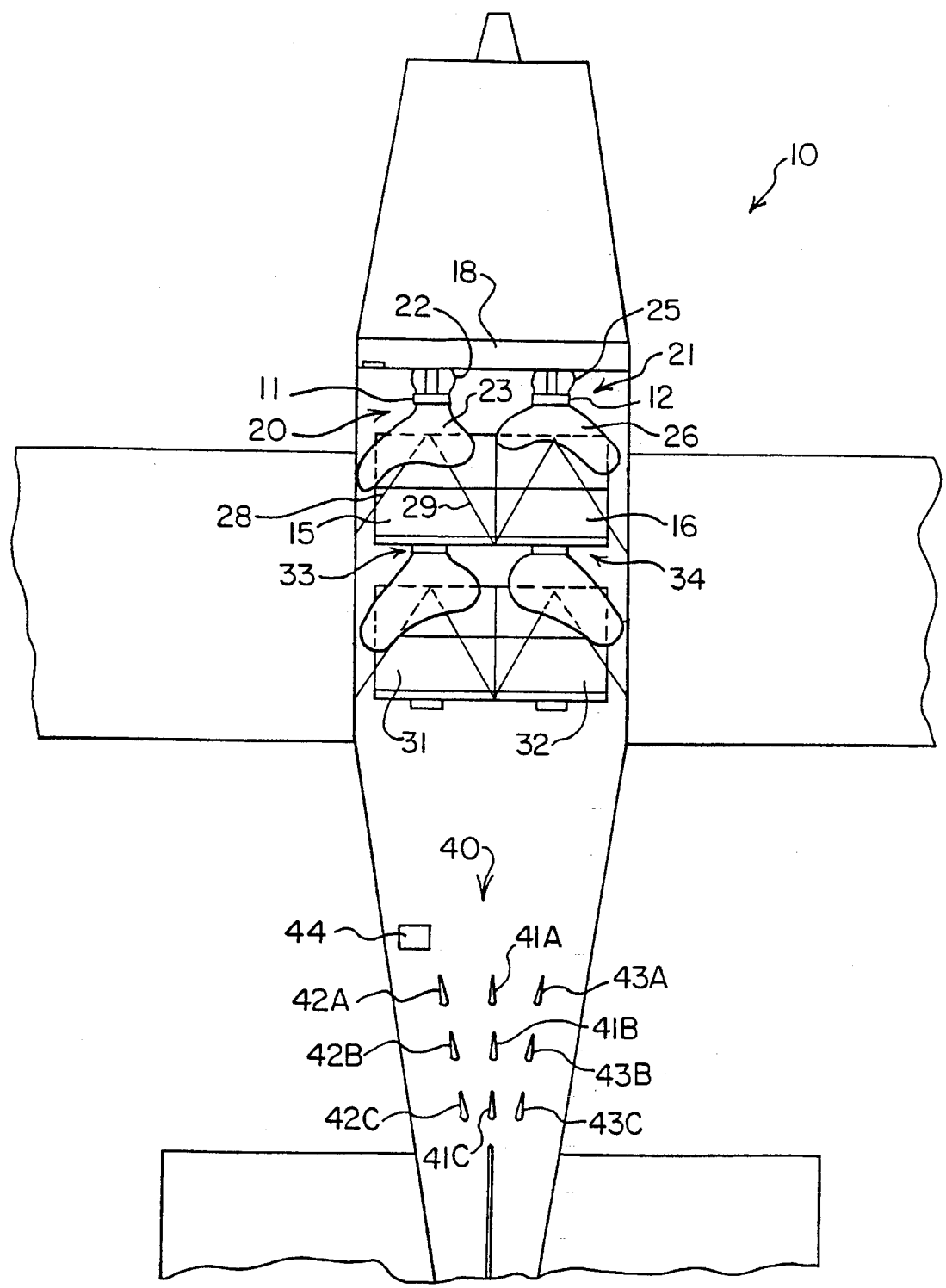
FIG. 1 is a top view of a four passenger aircraft that includes the invention.

FIG. 1 is a top, somewhat schematic view of an exemplary four-passenger aircraft 10 that includes the present invention. As is typical, aircraft 10 has two control columns or yokes 11 and 12, either extending toward seats 15 and 16 from the instrument panel, or extending from front wall 18, as shown, or extending upwardly as sticks, or pedestals from the floor, in front of seats 15 and 16.

Airbag storage and actuating assemblies 20 and 21 are, respectively, attached to (or constructed as an integral element of) each of the yokes 11 and 12, or are attached to the instrument panel. Assemblies 20,21 are connected to airbag actuating control circuitry via cable 19 of FIG. 2. The airbags associated with assemblies 20,21 are each configured to produce dual lobes when actuated, such as 22 and 23 for assembly 20, and 25 and 26 for assembly 21. Lobes 22 and 25 extend toward front wall 18, while lobes 23 and 26 extend toward the respective occupants of seats 15 and 16.

Figure 2:
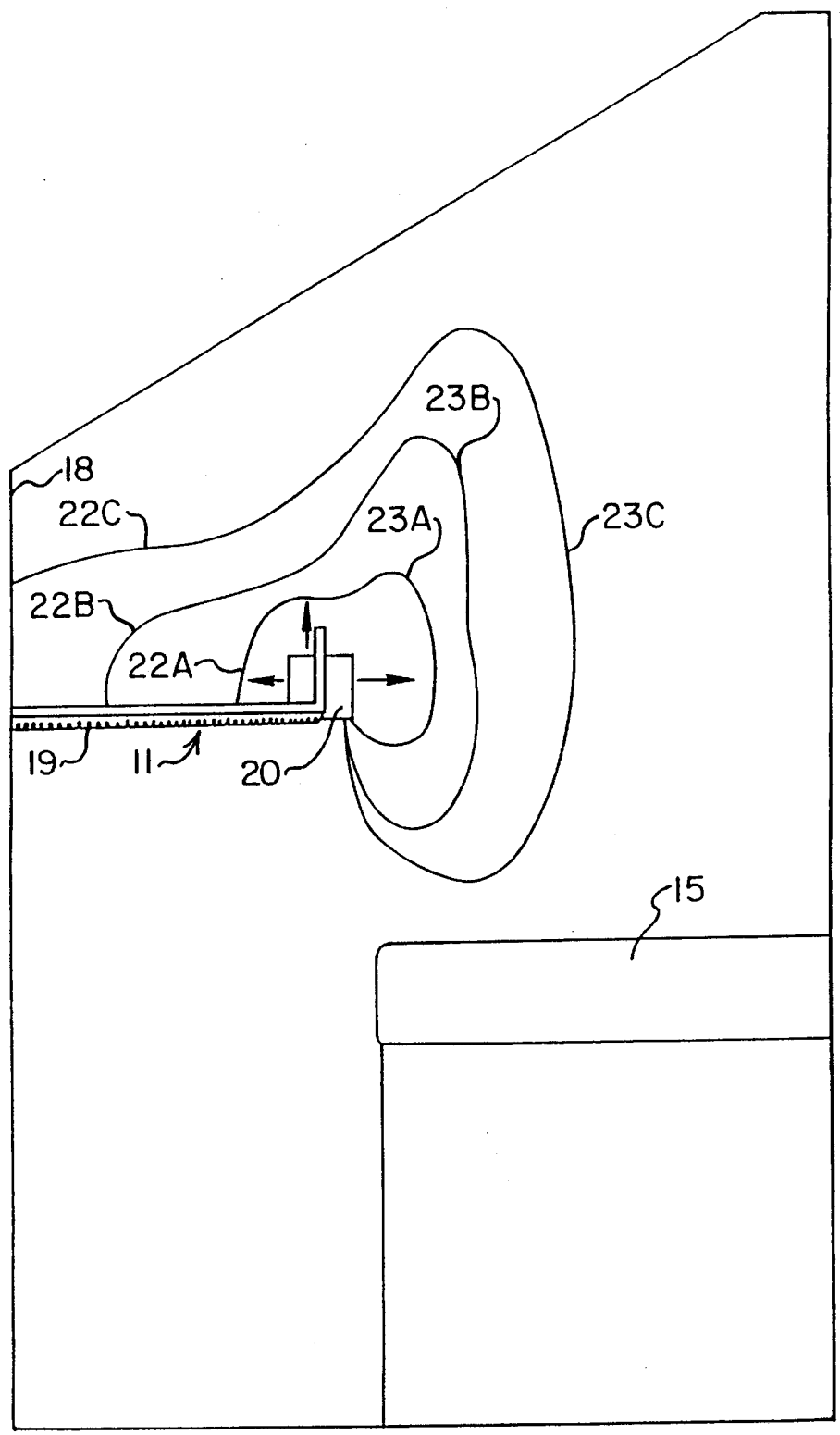
FIG. 2 is a side view showing the positioning of an airbag relative to the control yoke of the aircraft of FIG. 1.

FIG. 2 presents a side view of yoke 11, and the airbag actuation sequence from this yoke's airbag assembly 20. Discharge of expansion gas at assembly 20 causes the airbag to expand, as is generally illustrated by the three sequential airbag positions 22A/23A, 22B/23B and 22C/23C. The airbag is configured such that the forwardly-directed lobe 22 engages the aircraft's front wall 18 at approximately the same time that the full extension of rear-facing lobe 23 engages the front of the pilot, or occupant in seat 15. As a result, yoke 11 is maintained in a neutral position, and is not forced into a undesirable motion. As an example, an airbag inflation/deflation sequence takes place in about 1/10th second.

Rear seats 31 and 32 of aircraft 10, FIG. 1, likewise include airbag assemblies 33 and 34 which expand from the rear of seats 15 and 16 upon actuation thereof.

By operation of the present invention, actuation of airbag assemblies 20,21,33,34, in response to an initial accelerating impact upon aircraft 10, will be effected only when normal aircraft operating parameters, such as aircraft weight, aircraft altitude, aircraft speed, and/or aircraft angle of attack indicate that airbag inflation will not be a hindrance to safety; for example, an airbag inflation/deflation event will not be a hindrance to the pilot regaining aircraft control when aircraft operating circumstances indicate that continued aircraft control is likely. While the operating parameters of aircraft weight, altitude, speed, and/or angle of attack are suggested, these parameters are not to be taken as a limitation on the spirit and scope of the invention, since it is recognized that the aircraft operating parameters that are selected in accordance with the spirit and scope of the invention may vary (for example, with aircraft size and type).

As used herein, the term acceleration force is to be considered generally synonymous with terms such as G force and deceleration force.

Mounted toward the tail of aircraft 10 are arrays 40 of conventional acceleration-activated sensor strings 41, 42 and 43. Sensor strings 41–43 are made up of multiple sensors to enhance reliability. The central string, made up of sensors 41A, 41B and 41C, is essentially aligned with the central axis of aircraft 10 and, therefore, corresponds to the normal direction of travel of aircraft 10.

The left string of sensors 42A–42C and right string of sensors 43A≧43C are each offset in alignment from central string 41, such as by 30-degrees. This allows sensing of acceleration forces even when aircraft 10 is moving in a direction that is displaced from directly straight ahead, which frequently happens because of air currents, winds and the like. Of course, it is possible to include additional strings of sensors in a fan pattern in an even more offset relation to the central axis of aircraft 10.

The majority voting, signal thresholding, or signal verification circuitry for responding to the output signals produced by array 40, is mounted (for example, at 44), and is likewise conventional. Circuitry 44 is coupled to receive the acceleration signals and, when appropriate, to activate all of the above-mentioned aircraft airbag assemblies.

The sensors of array 40 are activated by an injury-threatening acceleration that is located on the longitudinal aircraft axis, or is within a range of angular displacement from that axis, such as approximately 30-degrees on either side thereof. Single sensors, or strings 41–43, are acceptable, but it is preferable to include two or more sensors in each full set of acceleration sensor strings for redundancy. If three sensors are used, as shown, and a majority output from at least two of the three sensors is needed to activate the airbag(s), the prospect of a false activation of the airbag(s) becomes very remote.

Figure 3:
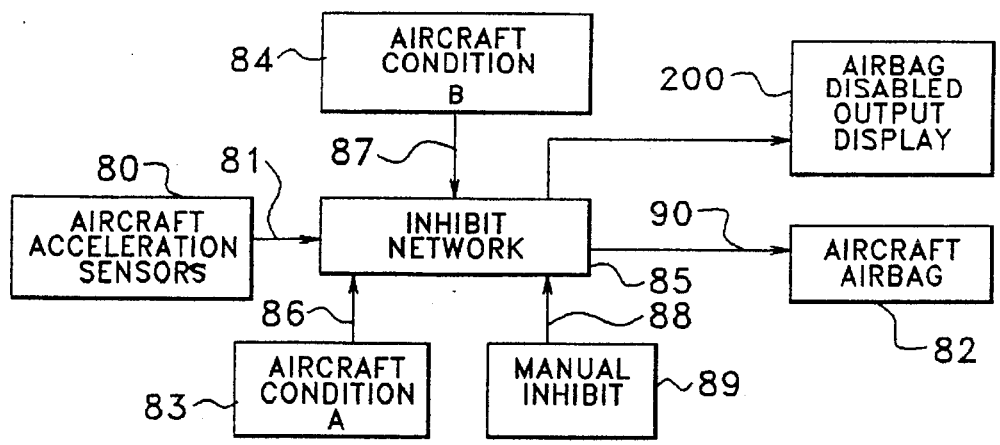
FIG. 3 is a diagrammatic showing of a feature of the invention.

FIG. 3 is a diagrammatic showing of a feature of the invention, whereby inflation of aircraft airbag 82 adaptively takes place as a result of an output 81 from aircraft acceleration sensors 80 only when certain aircraft operating parameters or conditions are meet. In this figure, two aircraft-operating parameters 83 and 84 are arbitrarily designed as condition A and condition B. As stated, it is preferred, but not critical to the invention, that sensors 80 provide an output 81 only when a threshold or verification condition, such as majority voting, has been satisfied.

An inhibit network 85 receives, as control inputs, output 81 from sensors 80, output 86 from condition 84, output 87 from condition 84, and output 88 from a pilot's manual airbag inhibit or on/off switch 89. An output signal 90 from inhibit network 85, when present, operates to activate an inflation/deflation event for airbag 82.

As an example of the operation of FIG. 3, but without limitation hereto, network 85 is constructed and arranged to provide activation of airbag 82 only when signal 81 is present, and signal 88 is not present, and signal 86 is present, and signal 87 is not present, as is shown in FIG. 3. In other words, airbag 82 will be activated, or fired, only when all four of the following criteria are met: (1) acceleration sensor 80 indicates the presence of an excessive acceleration force on the aircraft, (2) the pilot has not disabled airbag actuation by operation of switch 89, (3) aircraft operating parameter 83 is present, (4) aircraft operating parameter 84 is not present.

As a feature of the invention, a visual or audio display 200 may be provided in all such embodiments of the invention to thereby alert the pilot to the fact that airbag 82 has been disabled.

Figure 4:
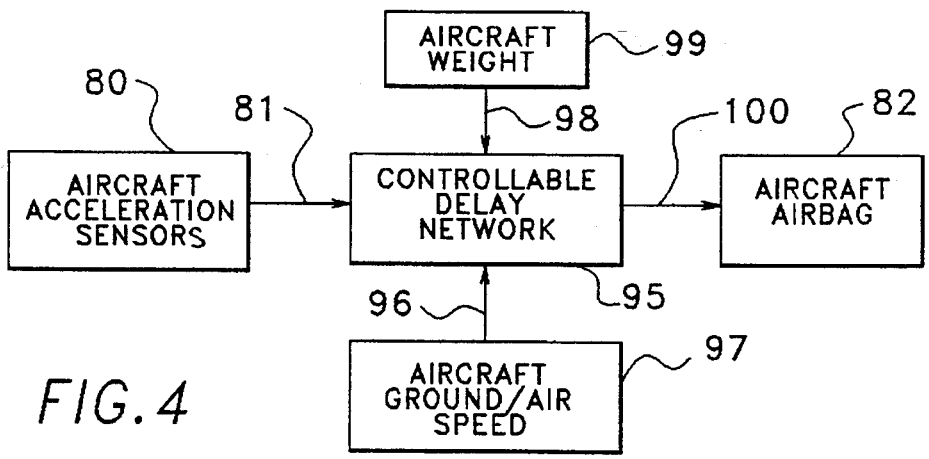
FIG. 4 is a diagrammatic showing of another feature of the invention.

FIG. 4 is a diagrammatic showing of a feature of the invention, whereby aircraft airbag 82 is provided with a variable inflation profile, or time of inflation by way of controllable delay network 95.

As with FIG. 3, inflation of aircraft airbag 82 takes place as a result of an output 81 from aircraft acceleration sensors 80. Again, it is preferred, but not critical to the invention, that sensors 80 provide an output 81 only when a threshold condition, such as majority or magnitude voting, has been satisfied.

Controllable delay network 95 receives as three control inputs, output 81 from sensors 80, output 96 from an aircraft condition 97, such as aircraft ground and/or air speed, and output 98 from an aircraft condition 99, such as 84 aircraft weight. An output signal 100 from network 95, when present, operates to activate an inflation/deflation event for airbag 82.

As an example of the operation of FIG. 4, but without limitation hereto, network 95 is constructed and arranged to provide activation of airbag 82 whenever signal 81 is present. However, the airbag's time of inflation and/or the airbag's inflation profile (for example, a profile as shown in FIG. 2) is controlled in accordance with a time delay and/or time delay profile that is adaptively established by aircraft conditions 97 and 99. In accordance with the invention, the output signals 96,98, representative of aircraft conditions 97,99, may be binary signals, or they may be analog signals reflecting the magnitude of aircraft conditions 97 and/or 99, it being recognized that aircraft speed and weight are important parameters, but are shown here as examples only.

Figure 5:
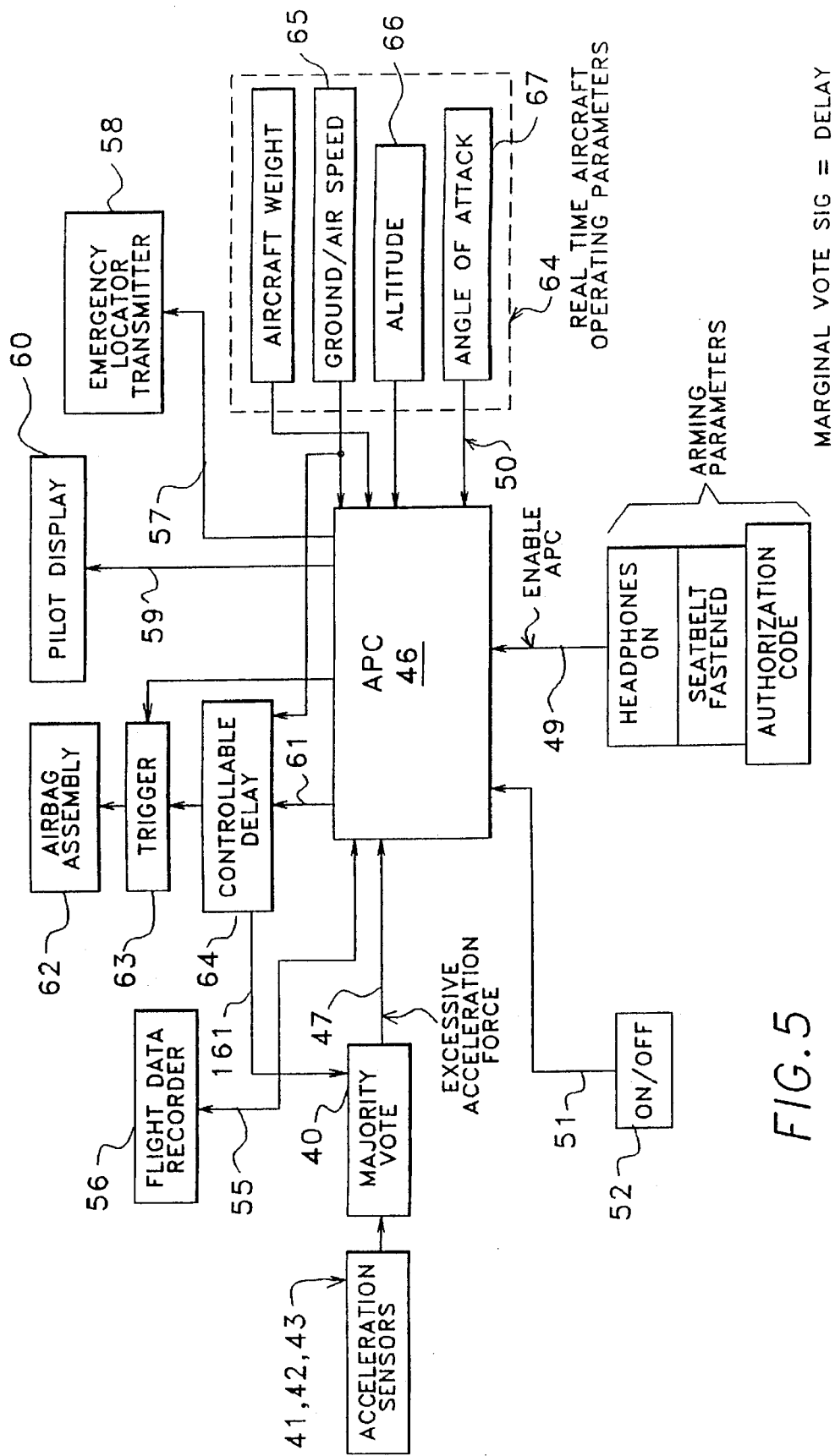
FIG. 5 is a showing of control circuitry of the invention that includes an Adaptive Programmable Controller (APC) and the features of the invention shown in FIGS. 3 and 4.

FIG. 5 is a detailed showing of the invention that includes the features of FIGS. 3 and 4, whereby the airbag assemblies 20,21,33,34 of FIG. 1 are controlled in accordance with the invention. As stated, in accordance with the invention, actuation of airbag assemblies 20,21,33,34 is effected in response to an acceleration output signal from acceleration sensors 41,42,43 only when aircraft operating parameters (for example, aircraft weight, altitude, speed, and/or angle of attack) indicate a positive benefit would result from an airbag inflation, should an airbag inflation/deflation event occur. While not a limitation on the invention, it is contemplated that the control aspects of FIG. 5 be implemented by the use of an adaptive programmable controller or APC 46. APC 46 is shown as having four inputs. Of course, as is usual, APC 46 would be programmed to accept many other inputs.

A first input to APC 46 comprises input 47 that is present upon acceleration sensors 41,42,43, indicating the occurrence of an excessive acceleration force on aircraft 10, signal 47 being implemented by the output of a majority voting, verification, or thresholding network 48 of conventional construction and arrangement.

A second input to APC 46 comprises an enable input 49 that enables APC 46 to operate upon the entry of certain arming information by the aircraft pilot. Nonlimiting examples of such information are pilot headphones on, seat belt(s) fastener, and an aircraft usage authorization code.

A third input to APC 46 comprises an input 50 that indicates the status of real-time aircraft operating parameters 64. Nonlimiting examples of such operating parameters are aircraft weight, aircraft ground and/or air speed 65, aircraft altitude 66, and aircraft angle of attack 67 relative to the horizontal. Other aircraft operating parameters that are useful in accordance with the spirit and scope of the invention will be apparent to those of skill in the art; for example, the rate of change of altitude and/or speed, and a combination of any of these parameters.

A fourth input 51 to APC 46 comprises an optional pilot-operable manual on/off switch 52 that can be selectively actuated by the pilot to completely disable inflation of airbag assembly 62.

Five exemplary outputs are shown for APC 46. Of course, as is usual, APC 46 would be programmed to perform many other functions that are not related to the invention.

A first output 55 from APC 46 operates to control flight data recorder 56 in a conventional manner.

A second output 57 from APC 46 operates to activate emergency locator transmitter 58, as will be described in relation to FIG. 6.

A third output 59 from APC 46 operates to activate pilot display 60 in order to provide the pilot with visual and/or audio information relative to the operation of aircraft 10 and/or operation of the invention.

A fourth output 161 from APC 46 operates to activate airbag assembly 62, which comprises one or more of the airbag assemblies 20,21,33,34 of FIG. 1, in accordance with the invention. While not a limitation on the invention, airbag assembly 62 is activated upon the energization of a well-known trigger means 63. As explained relative to FIG. 4, a controllable signal delay means may be provided to give a controlled profile of, or time of, inflation of airbag assembly (for example, in accordance with aircraft weight).

A fifth output 61, 64, 161 from APC 64 operates to interrogate majority vote network a second time. For example, should excessive acceleration signal 47 be of marginal value, then it may be desirable to again interrogate acceleration sensors 41,42,43 to determine that an excessive acceleration event has in fact occured.

Figure 6:
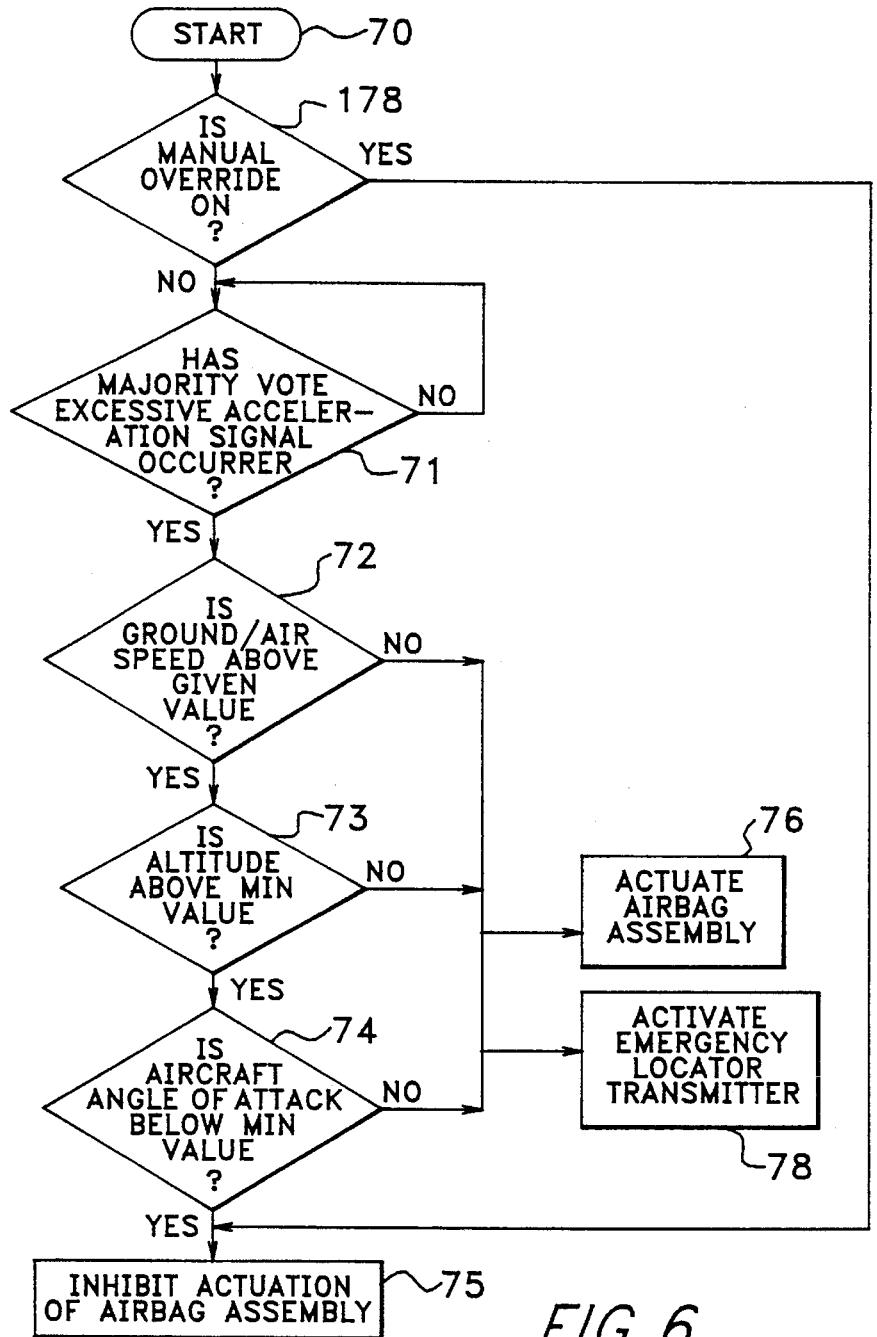
FIG. 6 is a flowchart showing operation of the control circuitry of FIG. 5.

FIG. 6 is a flowchart showing the operation of the control circuitry of FIG. 5. Operation of programmed APC 46 to implement the invention begins at start event 70. Start event 70 occurs in a nonlimiting manner, as by manual operation of a start key by the pilot, or perhaps by operation of strain gages that are associated with the engine start of aircraft 10. As a first decision to be made, block 178 determines if on/off switch 52 of FIG. 5 is set to the off position. If it is, box 75 is enabled to inhibit activation of the airbag assembly.

If switch 52 is set to the on position, decision box 71 becomes operable to continuously monitor output signal 47 from acceleration sensors 41,42,43. As long as output 47 is not present, the operation of FIG. 6 loops at decision box 71.

When an output signal 47 from acceleration sensors 41,42,43 is detected, decision box 72 operates to determine if ground and/or air speed 65 is above a given value whose magnitude is not critical to the invention, and will vary from one aircraft type to another. If aircraft speed 65 is above the given value, then decision box 73 operates to determine if aircraft altitude 66 is above a minimum value whose magnitude is again not critical to the invention, and will vary from one aircraft type to another. If aircraft altitude 66 is above the critical value, then decision box 74 operates to determine if aircraft angle of attack 67 is below a critical value whose magnitude is again not critical to the invention, and will vary from one aircraft type to another. As will be appreciated, the APC work flow of FIG. 6 can be readily modified by those skilled in the art to include other aircraft operating parameters, such as aircraft weight, without departing from the spirit and scope of the invention.

When an abnormal acceleration has occurred, but aircraft operation parameters 65,66,67 are such that airbag activation is not desirable, then airbag assembly 62 of FIG. 5 is inhibited by function box 75. However, when any one of the aircraft operating parameters 65,66,67 indicates that airbag inflation is desirable, then function box 76 is enabled to activate airbag assembly 62. FIG. 6 shows that function box 78 is enabled to activate emergency locator transmitter 58 of FIG. 5 concurrently with activation of airbag assembly 76. As an alternative procedure, function 78 can be enabled earlier in the process (for example, by way of a yes output from function box 71).

For purposes of convenience, the invention has been described while making reference to activation airbag assembly 62 in the absence of any one of the aircraft operation parameters 65,66,67. However, it is within the spirit and scope of the invention to require the Boolean operation of conjunction, logical multiplying, or ANDing of a number of such operation parameters as a determination of whether or not airbag assembly 62 is to be actuated in response to acceleration output signal 47.

Figure 7:
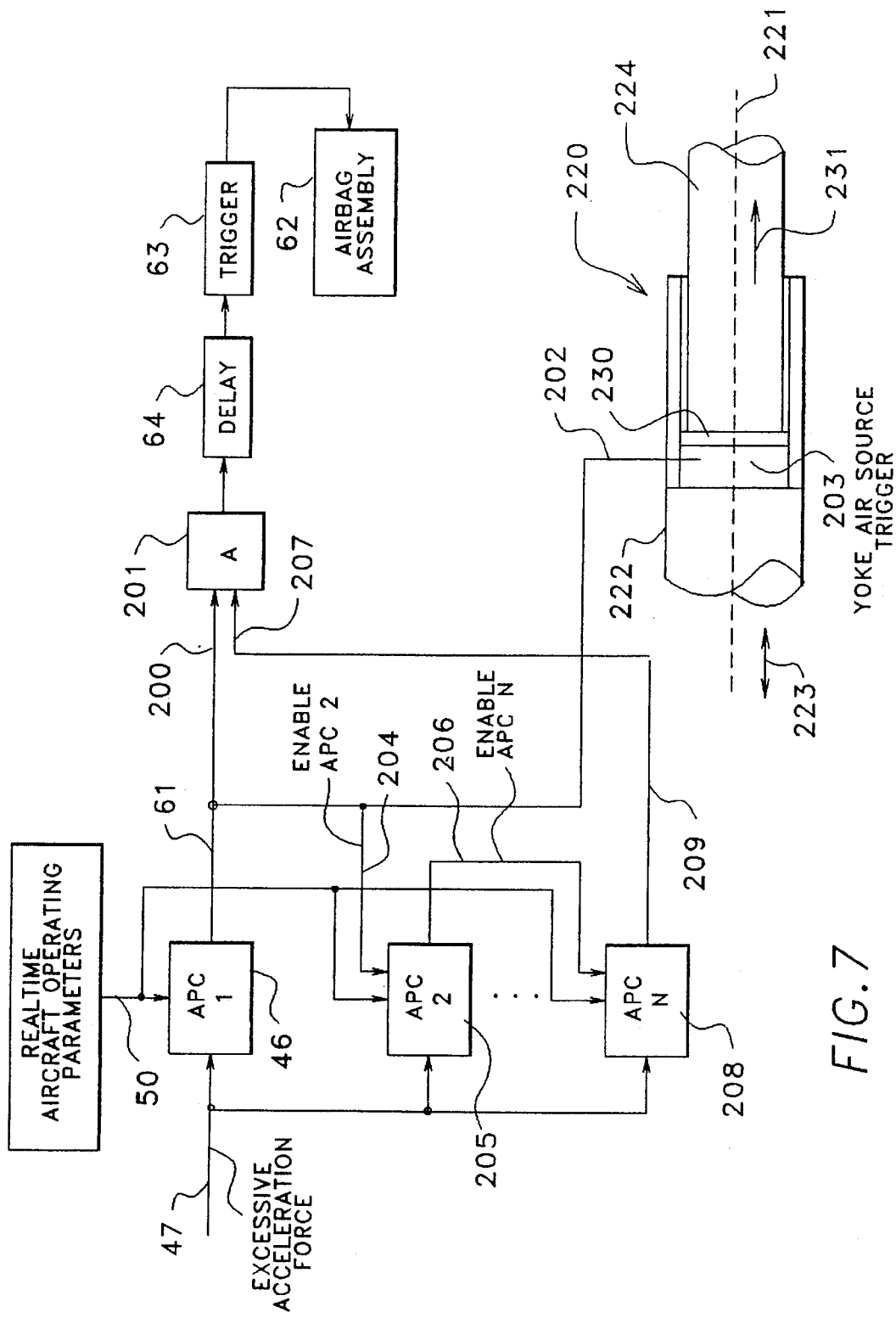
FIG. 7 shows a feature of the invention whereby a plurality of the APC circuits, shown in FIG. 5, are used to control an airbag assembly in a delayed manner relative to the actuation of a telescoping aircraft control yoke.

FIG. 7 shows a feature of the invention, whereby a plurality of the APC circuitry of FIG. 5 is used to control airbag assembly 63 in a delayed manner relative to the actuation of a telescoping aircraft yoke 220, as described in the above-mentioned related copending patent entitled "Aircraft Control Yoke".

As is described in this copending patent application, yoke 220 comprises a generally horizontal tubular member 222 that extends outward from the aircraft's generally vertical control panel (not shown). Yoke member 222 is selectively movable in and out, as is represented by arrow 223, as the pilot controls aircraft pitch. Yoke member 222 is releasably attached to a second tubular yoke member 224 by a releasable coupling means (not shown). Yoke member 224 terminates at pilot control grips or handles (not shown). By the use of these hand grips, the pilot controls aircraft pitch by moving yoke 222,224, as is represented by arrow 223, and the pilot controls aircraft roll by rotating yoke 222,224 about its axis 221.

As is described in this copending patent application, upon the need to inflate or activate an airbag assembly, such as 62, yoke members 222,224 automatically uncouple, and a force means, such as gas-generating pellet 203, selectively operates to provide a force in cavity 230, thus causing yoke member 224 to move a given distance to the right, as is represented by arrow 231. Thus, airbag assembly 62 and telescoping yoke 222,224 are operated generally concurrently. Means are provided, in accordance with this copending patent application, to enable the pilot to selectively and manually reset yoke 222,224 to its coupled position after an inflation/deflation event of airbag assembly 62.

An object of this embodiment of the present invention is to (1) activate airbag assembly 62 as a function of a combination of an excessive acceleration force signal 47, and the real-time aircraft operating parameter signals 50, as above described, and (2) to activate yoke air source trigger 203 of the above-mentioned copending patent application in a controlled manner prior to the activation of airbag assembly 62.

With reference to FIG. 7, and as above described, excessive acceleration force input 47 provides a first input 47 to APC 46, and real-time aircraft operating parameters provide a second input 50 to APC 46. As a result, output 61 is applied to a first input 200 of an AND gate 201.

Output 61 from APC 46 also operates as an actuating input 202 to effect extension of an aircraft yoke with which airbag assembly 62 is associated and, more specifically, the immediate firing of yoke air source trigger 203, as is described in the above-mentioned copending patent application.

In addition, output 61 from APC 46 provides an enable input 204 to a second APC 204 that is constructed and arranged to perform the identical function that is performed by APC 46; i.e., inputs 47 and 50 are also applied to APC 205, and generally it is expected that APC 205 will then provide an output 206 that is functionally identical to output 61 from APC 46.

While output 206 from APC 205 can be connected to the second input 207 of AND gate 201 in FIG. 7, output 206 is shown connected to an Nth APC 208 that is also constructed and arranged to perform the identical function that is performed by APCs 46 and 208; i.e., inputs 47 and 50 are also applied to APC 208, and generally it is expected that APC 208 will then provide an output 209 that is functionally identical to output 61 from APC 46 and output 206 from APC 205.

It will be appreciated that a number of APCs can be inserted in a string between APC 205 and 208. Should a predetermined number of APCs in the string 46 to 208 fail to provide an output signal in response to inputs 47 and 50, yoke trigger source 203 will be activated, but airbag assembly 62 will not be activated.

In this embodiment of the invention, all, or a predetermined number of APCs in the string, must provide an output indicating that airbag 62 should be inflated. That is, APC 46 must provide a first input 200 to AND gate 201, all intermediate APCs (such as APC 205) must provide an enable input to the next APC in the APC string, and the last APC in the APC string (such as APC 208) must provide a second input 207 to AND gate 201. Only when these conditions are satisfied will airbag 62 experience an inflation/deflation event.

Figure 8:
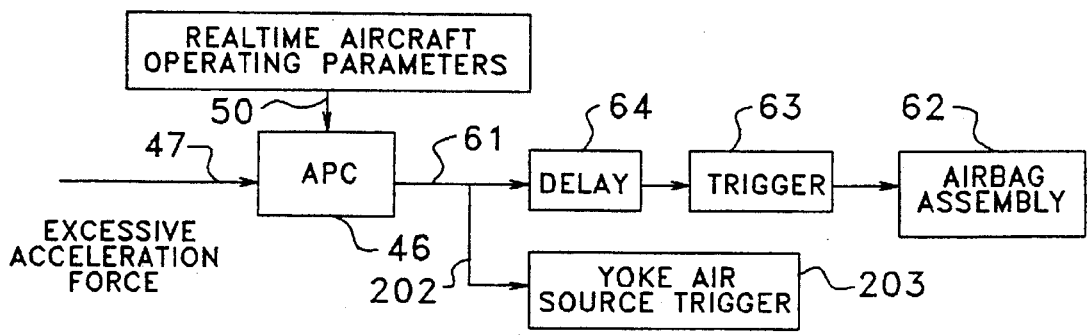
FIG. 8 shows another feature of the invention whereby a single APC circuit, as shown in FIG. 5, is used to control an airbag assembly in a delayed manner relative to the actuation of a telescoping aircraft yoke.

FIG. 8 shows another feature of the invention, whereby the APC circuitry of FIG. 5 is used to control airbag assembly 63 in a delayed manner relative to the actuation of a telescoping aircraft yoke, as described in the above-mentioned copending patent application.

An object of this embodiment of the invention is to (1) activate airbag assembly 62 as a delayed function of both an excessive acceleration force signal 47 and the real-time aircraft operating parameter signals 50, as above described, and (2) to thereafter activate yoke air source trigger 203 of the above-mentioned copending patent application.

As above described, excessive deceleration force input 47 provides a first input 47 to APC 46, and real-time aircraft operating parameters provide a second input 50 to APC 46. As a result, output 61 is applied to delay network 64 to activate airbag assembly 62 with a time delay of about 10 milliseconds.

Output 61 from APC 46 also operates as an actuating input 202 to effect extension of an aircraft yoke with which airbag assembly 62 is associated, as is described in the above-mentioned copending patent application. This effect is achieved by the immediate (i.e., with no time delay) activation of yoke air source trigger 203. Thus, the yoke that is associated with airbag assembly 62 is caused to extend and move away prior to the extension of airbag assembly 62.

Figure 9:
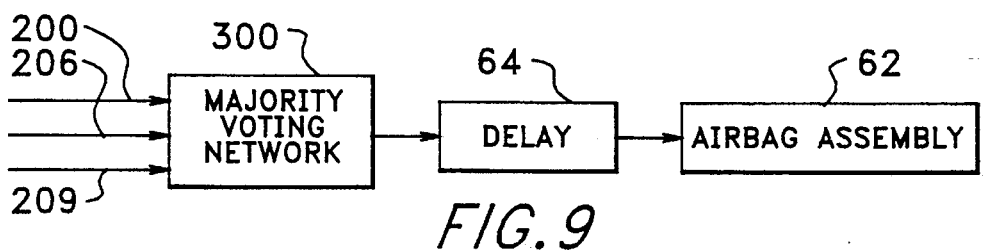
FIG. 9 is a variation of the FIG. 7 embodiment of the invention wherein a verification or thresholding network, such as a majority voting network, receives the outputs from the APCs of FIG. 7.

FIG. 9 shows a variation of the FIG. 7 embodiment of the invention wherein a verification, or thresholding network, such as majority voting network 300, receives the outputs 200, 206 and 209 from APCs 46, 205 and 208, respectively. In this embodiment of the invention, airbag assembly 62 is actuated as a function of all, or a designated number of the N APC circuits of FIG. 7, determining that aircraft operating parameter, or parameters 50, indicate a likelihood for continued control of the aircraft. The embodiment of the invention shown in FIG. 9 does not require the sequential APC enable function of FIG. 7; however, this sequential enable feature can be used in the FIG. 9 embodiment, if desired.

While the invention has been described in detail while making reference to preferred embodiments thereof, it is recognized that those skilled in the art will, upon learning of the invention, readily visualize yet other embodiments that are within the spirit and scope of the invention. Thus, the spirit and scope of the invention is not to be limited by the above detailed description.

What is claimed is:

1. Apparatus for controlling the inflation of an airbag in an aircraft, the aircraft including a control member for manual movement by a pilot to facilitate control of the aircraft, the apparatus comprising;

first means for sensing that the aircraft has experienced an excessive acceleration force, and for generating a control signal in response to said acceleration force, an airbag mounted relative to said control member and relative to the pilot, said airbag being responsive to said control signal, second means for sensing an aircraft operating parameter, and means responsive to said second means and operable to prevent response of said airbag to said control signal as a function of the presence of said operating parameter.

2. The apparatus of claim 1 wherein said second means operates to sense aircraft altitude, said second means operating to prevent response of said airbag to said control signal as a function of said aircraft altitude.

3. The apparatus of claim 2 wherein said second means operates to sense aircraft speed, said second means operating to prevent response of said airbag to said control signal as a function of said aircraft speed.

4. The apparatus of claim 3 wherein said second means operates to sense the aircraft angle of attack relative to horizontal, said second means operating to prevent response of said airbag to said control signal as a function of said aircraft angle of attack.

5. The apparatus of claim 4 including means whereby response of said airbag to said control signal may be manually inhibited.

6. The apparatus of claim 4 including;

controllable delay means for controlling a time parameter in the inflation of said airbag, and means responsive to an aircraft operating parameter for controlling said delay means.

7. Processor controlled aircraft airbag actuation apparatus selectively operable to determine if aircraft operation conditions are appropriate for activating an airbag assembly, the apparatus comprising;

an airbag assembly mounted relative to an aircraft seat, first sensing means for sensing that the aircraft has experienced an excessive acceleration force, and for generating a first control signal in response to said excessive force, second sensing means for sensing an operating parameter of the aircraft, and for providing a second control signal as a function of said operating parameter, processor means receiving said first control signal and said second control signal as first and second inputs, and having an output for actuating said airbag assembly in response to said first and second inputs, and programmed means for said processor means operable to cause said processor means to respond to said second control signal in a manner to prevent actuation of said airbag assembly in response to said first control signal when said aircraft operating parameter indicates a likelihood for continued control of the aircraft.

8. The apparatus of claim 7 wherein said operating parameter is selected from the group aircraft weight, aircraft altitude, aircraft speed, and/or aircraft angle of attack.

9. The apparatus of claim 7 wherein said second sensing means comprises;

a plurality of acceleration force sensors, and verification means for providing said second control signal as a function of a majority of said plurality of force sensors detecting an aircraft acceleration force.

10. The apparatus of claim 7 including delay means for delaying actuation of said airbag.

11. The apparatus of claim 10 wherein said delay means is a controllable delay means wherein said delay means is controlled as a function of an aircraft operating parameter.

12. The apparatus of claim 7 including;

emergency locator means, and said processor means having a second output operable to activate said emergency locator means upon the occurrence of said first control signal.

13. The apparatus of claim 7 wherein said operating parameter of the aircraft is sensed in real time.

14. A method for controlling aircraft airbag inflation, the aircraft including a control member for manual movement by a pilot to facilitate control of the aircraft, the apparatus comprising;

providing first means for sensing that the aircraft has experienced an acceleration force, and for generating a control signal in response to said force, providing an airbag mounted relative to said control member and relative to the pilot, said airbag normally being responsive to said control signal, providing second means for sensing an operating parameter of the aircraft, and providing means responsive to said second means and operable to prevent response of said airbag to said control signal as a function of said operating parameter.

15. The method of claim 14 wherein said second means operates to sense aircraft altitude, and wherein said second means operates to prevent response of said airbag to said control signal as a function of aircraft altitude.

16. The method of claim 15 wherein said second means also operates to sense aircraft speed, and wherein said second means operates to prevent response of said airbag to said control signal as a function of both aircraft altitude and aircraft speed.

17. The method of claim 16 wherein said second means also operates to sense aircraft angle of attack relative to horizontal, and wherein said second means operates to prevent response of said airbag to said control signal as a function of aircraft weight, altitude, aircraft speed, and/or aircraft angle of attack.

18. The method of claim 14 including the steps of;

providing a controllable delay means for controlling the response of said airbag to said control signal, and controlling said delay means as a function of an aircraft operating parameter.

19. The method of claim 14 including the step of;

providing a manual override whereby response of said airbag to said control signal may be selectively inhibited.

20. The method of claim 19 including the step of;

providing means indicating that response of said airbag to said control signal has been inhibited.

21. The method of claim 14 including the steps of;

providing an emergency locator transmitter, and activating said transmitter as a function of said control signal.

22. A method for selectively inhibiting activation of an aircraft airbag assembly when aircraft operation conditions are appropriate for enabling a pilot to attempt to retain aircraft control, comprising the steps of;

providing an airbag assembly mounted relative to the pilot, providing first sensing means for sensing that the aircraft has experienced an excessive acceleration force, and for generating a first control signal in response to said force, providing second sensing means for sensing an operating parameter of the aircraft, and for providing a second control signal in response to said operating parameter, providing control means receiving said first control signal and said second control signal as first and second inputs, said control means having an output for actuating said airbag assembly in response to said first and second inputs, and providing means whereby said control means operates to respond to said second control signal in a manner to prevent actuation of said airbag assembly in response to said first control signal when said aircraft operating parameter indicates a likelihood that the pilot can retain control of the aircraft.

23. The method of claim 22 wherein said operating parameter is selected from the group aircraft weight, aircraft altitude, aircraft speed, aircraft angle of attack.

24. The method of claim 22 wherein said step of providing said second sensing means comprises the steps of;

providing a plurality of acceleration sensors, and providing majority voting means for generating said second control signal as a function of a majority of said plurality of acceleration sensors detecting an excessive aircraft acceleration force.

25. The method of claim 24 including the step of;

providing delay means for delaying actuation of said airbag.

26. The method of claim 24 including the steps of;

providing emergency aircraft locator means, and providing a second output for said control means operable to activate said emergency aircraft locator means upon the occurrence of said first control signal.

27. The method of claim 22 wherein said operating parameter is sensed in real time.

28. A method for determining when an aircraft airbag assembly is to be activated, comprising the steps of;

providing first means for sensing that the aircraft has experienced an excessive acceleration force, and for generating a control signal in response to said acceleration force, providing an airbag that is mounted relative to said control member and relative to the pilot, said airbag being responsive to said control signal, providing second means for sensing an aircraft operating parameter, and providing means responsive to said second means and operable to prevent response of said airbag to said control signal as a function of the presence of said operating paramter.

29. The method of claim 28 wherein said aircraft first means comprises a plurality of individual aircraft acceleration sensors, each of which provides an acceleration output signal indicative of the magnitude of an aircraft acceleration event, and including the step of;

subjecting said plurality of acceleration output signals from said plurality of acceleration sensors to a signal verification procedure prior to providing said acceleration output signal.

30. The method of claim 29 wherein said signal verification procedure comprises a majority voting procedure.

31. The method of claim 30 including the step of;

providing an output acceleration signal upon the concurrent occurrence of an aircraft acceleration event that is above a given magnitude, and upon said verification procedure indicating that a majority of said sensors have sensed said deceleration event above said given magnitude.

32. The method of claim 31 including the steps of;

providing a controllable time delay for activating said airbag assembly, providing a plurality of aircraft operational parameter signals that are indicative of a plurality of different aircraft operating parameters, and controlling said time delay as a function of at least one of said plurality of aircraft operational parameters.

33. Processor controlled aircraft apparatus for activating an airbag assembly and an extendable aircraft control yoke, comprising;

an airbag assembly mounted relative to an extendable aircraft control yoke, first sensing means for sensing an excessive acceleration force, and for providing a first control signal in response to said force, second sensing means for sensing an aircraft operating parameter, and for providing a second control signal as a function of said operating parameter, processor means receiving said first control signal and said second control signal as first and second inputs, said processor means having an output, said processor means being operable to respond to said first and second control signals to provide a processor output signal only when said aircraft operating parameter indicates that continued aircraft control is unlikely after the occurrence of said force, first means connecting said processor means output signal to said control yoke to produce extension of said control yoke generally concurrently with the occurrence of said processor means output signal, and second means connecting said processor means output signal to said airbag assembly to activate said airbag assembly with a time delay relative to the occurrence of said processor means output signal.

34. The apparatus of claim 33 wherein said aircraft operating parameter is selected from the group aircraft weight, aircraft altitude, aircraft speed, aircraft angle of attack.

35. The apparatus of claim 32 wherein said second sensing means comprises;

a plurality of acceleration force sensors, and verification means for providing said second control signal as a function of a majority of said plurality of force sensors detecting excessive aircraft acceleration.

36. The apparatus of claim 35 wherein said second means includes a controllable delay means whose delay time period is controlled as a function of an aircraft operating parameter.

37. The apparatus of claim 33 wherein said aircraft operating parameter is sensed in real time.

38. Apparatus for activating an aircraft airbag assembly and an extendable aircraft control yoke, comprising;

sensing means for sensing an excessive acceleration force and providing a control signal in response to said force, first means connecting said control signal to said control yoke to produce extension of said control yoke generally concurrently with the occurrence of said control signal, and second means connecting said control signal to said airbag assembly to activate said airbag assembly with a time delay relative to the occurrence of said control signal.

39. The apparatus of claim 38 wherein said sensing means comprises;

a plurality of acceleration force sensors, and verification means for providing said control signal as a function of a majority of said plurality of force sensors detecting an excessive aircraft acceleration force.

40. The apparatus of claim 38 wherein said second means includes a controllable delay means whose delay time period is controlled as a function of an aircraft operating parameter.

41. The apparatus of claim 40 wherein said aircraft operating parameter is sensed in real time.

42. Processor controlled aircraft apparatus for activating an airbag assembly and an extendable aircraft control yoke, comprising;

an airbag assembly mounted relative to an extendable aircraft control yoke, first sensing means for sensing an excessive acceleration force, and for providing a first control signal in response to said force, second sensing means for sensing an aircraft operating parameter, and for providing a second control signal as a function of said operating parameter, a plurality of processor means, each of said processor means receiving said first control signal and said second control signal as first and second inputs, and each of said processor means having an output, a first of said processor means being operable to respond to said first and second control signals to provide a first processor output signal only when said aircraft operating parameter indicates that continued aircraft control is unlikely after the occurrence of said force, first means connecting said first processor output signal to said control yoke to produce extension of said control yoke generally concurrently with the occurrence of said first processor output signal, a second of said processor means receiving said first processor output signal as an enable input, and said second processor means then being operable to respond to said first and second control signals to provide a second processor output signal only when said aircraft operating parameter indicates that continued aircraft control is unlikely after the occurrence of said force, and processor output signal verification means connecting said first and second processor means output signals to said airbag assembly to activate said airbag assembly with a time delay relative to the occurrence of said first processor means output signal.

43. The apparatus of claim 42 wherein said aircraft operating parameter is selected from the group aircraft weight, aircraft altitude, aircraft speed, aircraft angle of attack.

44. The apparatus of claim 42 wherein said second sensing means comprises;

a plurality of acceleration force sensors, and verification means for providing said second control signal as a function of a majority of said plurality of force sensors detecting an excessive aircraft acceleration force.

45. The apparatus of claim 42 wherein said processor output signal verification means includes a controllable time delay means whose delay time period is controlled as a function of an aircraft operating parameter.

46. The apparatus of claim 42 wherein said aircraft operating parameter is sensed in real time.

47. Processor controlled aircraft apparatus for activating an airbag assembly and an extendable aircraft control yoke, comprising;

first sensing means for sensing an excessive acceleration force, and for providing a first control signal as a function of said force, second sensing means for sensing an aircraft operating parameter, and for providing a second control signal as a function of said operating parameter, a plurality of series arranged processors, each of said processors receiving said first control signal and said second control signal as first and second inputs, and each of said processors having an output, each of said processors being operable to respond to said first and second control signals to provide a processor output signal only when said aircraft operating parameter indicates that continued aircraft control is unlikely after the occurrence of said force, means connecting the processor output signal of said plurality of processors as an enable input to the next processor in said series arranged processors, means connecting a processor output signal from one of said series arranged processors to said control yoke to produce extension of said control yoke generally concurrently with the occurrence of said first processor output signal, and processor output signal verification means connecting said processor output signals to said airbag assembly to activate said airbag assembly with a time delay relative to telescoping of said control yoke.

48. The apparatus of claim 47 wherein the processor output signal from said first of said series arranged processors is connected to said control yoke, and wherein the processor output signal from said first of said series arranged processors and the processor output signal from the last of said series arranged processors is connected to said signal verification means.

49. The apparatus of claim 47 wherein the processor output signal from all of said series arranged processors is connected to said signal verification means.

50. The apparatus of claim 47 wherein said processor output signal verification means includes a controllable time delay means whose delay time period is controlled as a function of an aircraft operating parameter.

51. The apparatus of claim 50 wherein said aircraft operating parameter is sensed in real time.

\* \* \* \* \*